United States Patent
Smith et al.

(10) Patent No.: US 12,435,772 B2
(45) Date of Patent: Oct. 7, 2025

(54) ELECTRONIC EXTERNAL BYPASS

(71) Applicant: Fox Factory, Inc., Duluth, GA (US)

(72) Inventors: Bobby Smith, San Diego, CA (US);
John Marking, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/601,144

(22) Filed: Mar. 11, 2024

(65) Prior Publication Data
US 2024/0344584 A1 Oct. 17, 2024

Related U.S. Application Data

(63) Continuation of application No. 17/337,854, filed on Jun. 3, 2021, now Pat. No. 11,927,242.

(60) Provisional application No. 63/035,167, filed on Jun. 5, 2020.

(51) Int. Cl.
| | |
|---|---|
| *F16F 9/42* | (2006.01) |
| *B60G 17/08* | (2006.01) |
| *F16F 9/46* | (2006.01) |
| *F16F 9/52* | (2006.01) |

(52) U.S. Cl.
CPC ............ *F16F 9/466* (2013.01); *B60G 17/08* (2013.01); *F16F 9/464* (2013.01); *B60G 2202/24* (2013.01); *B60G 2400/5182* (2013.01); *F16F 9/52* (2013.01)

(58) Field of Classification Search
CPC ..... B60G 17/08; F16F 9/42; F16F 9/46; F16F 9/464; F16F 9/466
USPC ....... 188/274, 313, 315, 318, 322.13, 322.2, 188/322.21
See application file for complete search history.

(56) References Cited

U.S. PATENT DOCUMENTS

| | | |
|---|---|---|
| 3,795,291 A | 3/1974 | Naito et al. |
| 3,986,118 A | 10/1976 | Madigan |
| 5,076,606 A | 12/1991 | Takahashi |
| 5,952,823 A | 9/1999 | Sprecher et al. |
| 8,627,932 B2 | 1/2014 | Marking |
| 8,857,580 B2 | 10/2014 | Marking |
| 9,033,122 B2 | 5/2015 | Ericksen et al. |
| 9,120,362 B2 | 9/2015 | Marking |
| 9,239,090 B2 | 1/2016 | Marking et al. |

(Continued)

FOREIGN PATENT DOCUMENTS

| | | |
|---|---|---|
| EP | 3290738 A1 | 3/2018 |
| EP | 3926204 A1 | 12/2021 |

OTHER PUBLICATIONS

European Search Report for European Application No. 21177881.6, 8 pages, Nov. 24, 2021.

*Primary Examiner* — Christopher P Schwartz

(57) ABSTRACT

An electronic external bypass for a shock assembly is disclosed herein. The electronic external bypass has a compression side fluid connection, a rebound side fluid connection, and an external bypass fluid flow path physically separate from the shock assembly, the external bypass fluid flow path fluidly coupling the compression side fluid connection with the rebound side fluid connection. The electronic external bypass includes a solenoid circuit, the solenoid circuit to control a flow of a working fluid through the external bypass fluid flow path, the solenoid circuit includes a poppet valve and an active valve configured to control a pop pressure of the poppet valve, such that the solenoid circuit provides an infinitely adjustable bypass pressure for the shock assembly.

14 Claims, 12 Drawing Sheets

(56) References Cited

U.S. PATENT DOCUMENTS

| | | |
|---|---|---|
| 9,353,818 B2 | 5/2016 | Marking |
| 11,927,242 B2* | 3/2024 | Smith .................... B60G 17/08 |
| 2012/0222927 A1* | 9/2012 | Marking ................... F16F 9/46 |
| | | 188/274 |
| 2014/0008160 A1 | 1/2014 | Marking et al. |
| 2014/0262646 A1 | 9/2014 | Marking |
| 2015/0081171 A1* | 3/2015 | Ericksen .............. B60G 17/018 |
| | | 701/37 |
| 2015/0345587 A1 | 12/2015 | Yamazaki |
| 2015/0354658 A1* | 12/2015 | Marking ................ B60G 17/08 |
| | | 188/313 |
| 2018/0010666 A1 | 1/2018 | Marking |

* cited by examiner

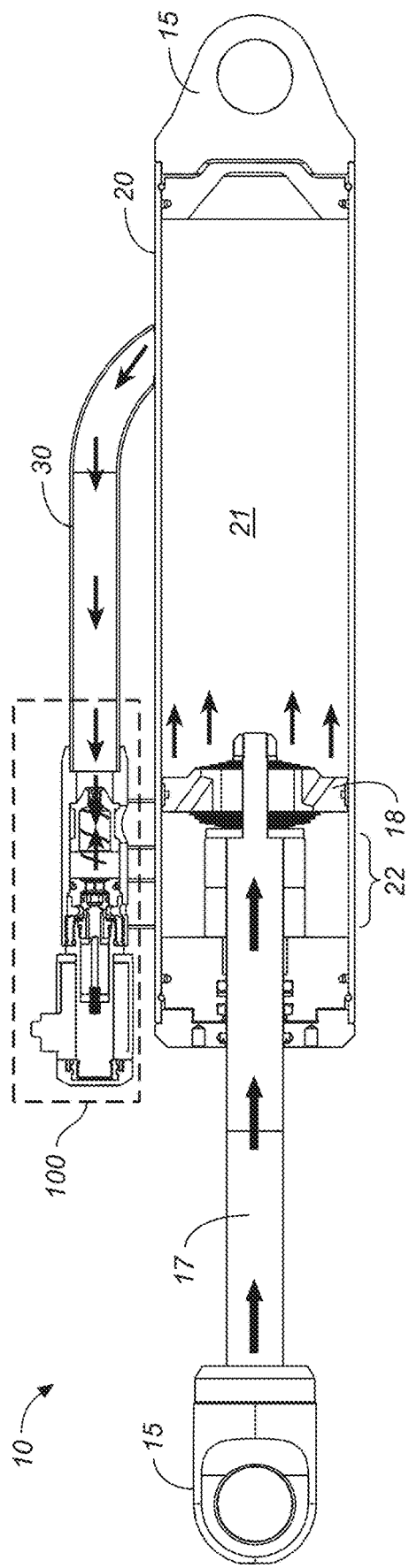
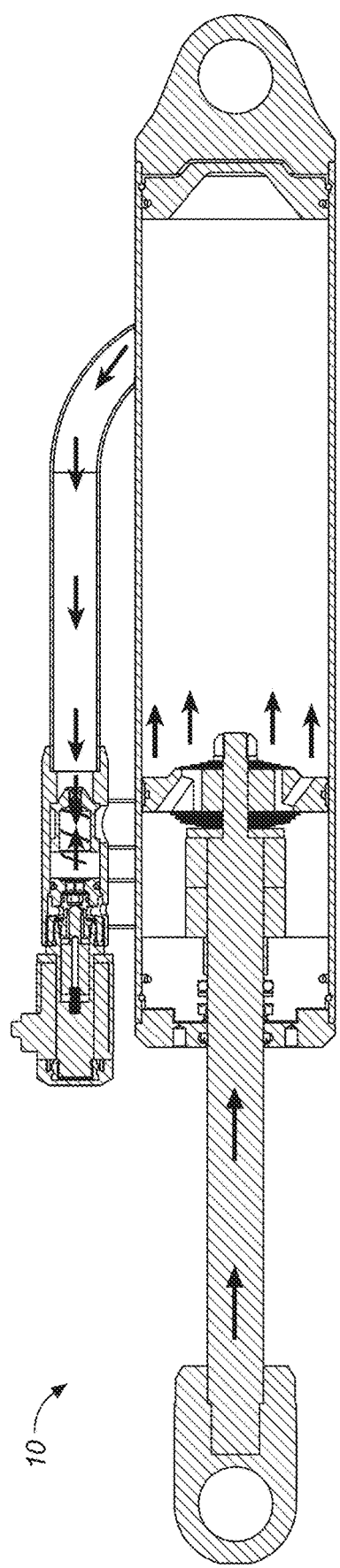
FIG. 1A
FIG. 1AL

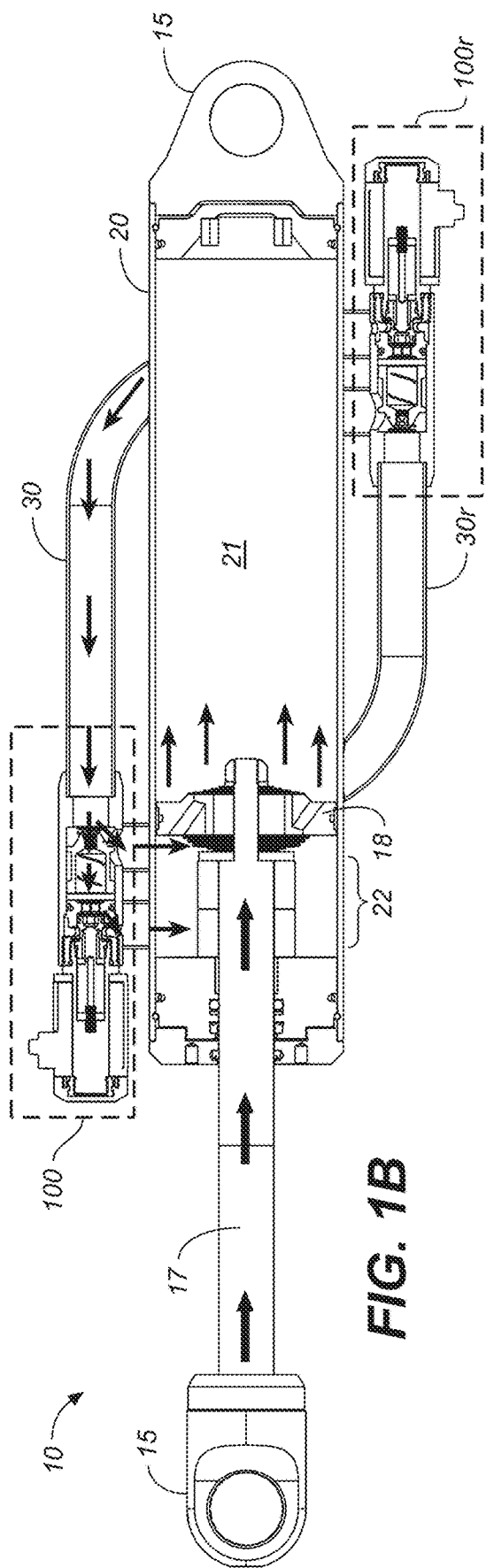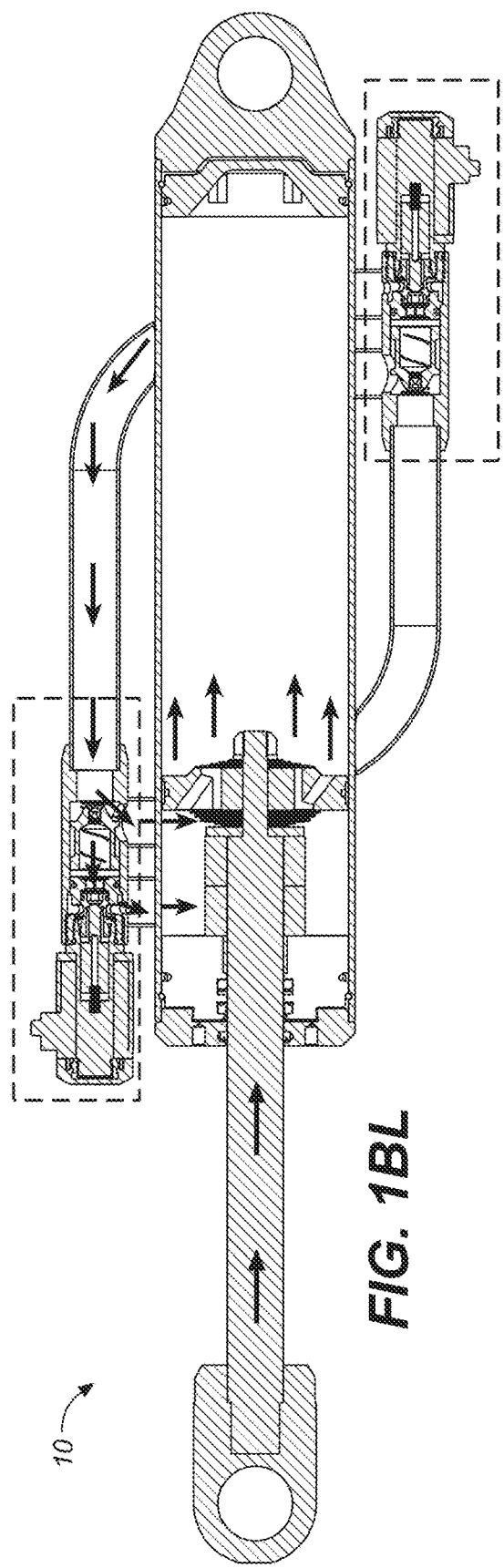
FIG. 1B
FIG. 1BL

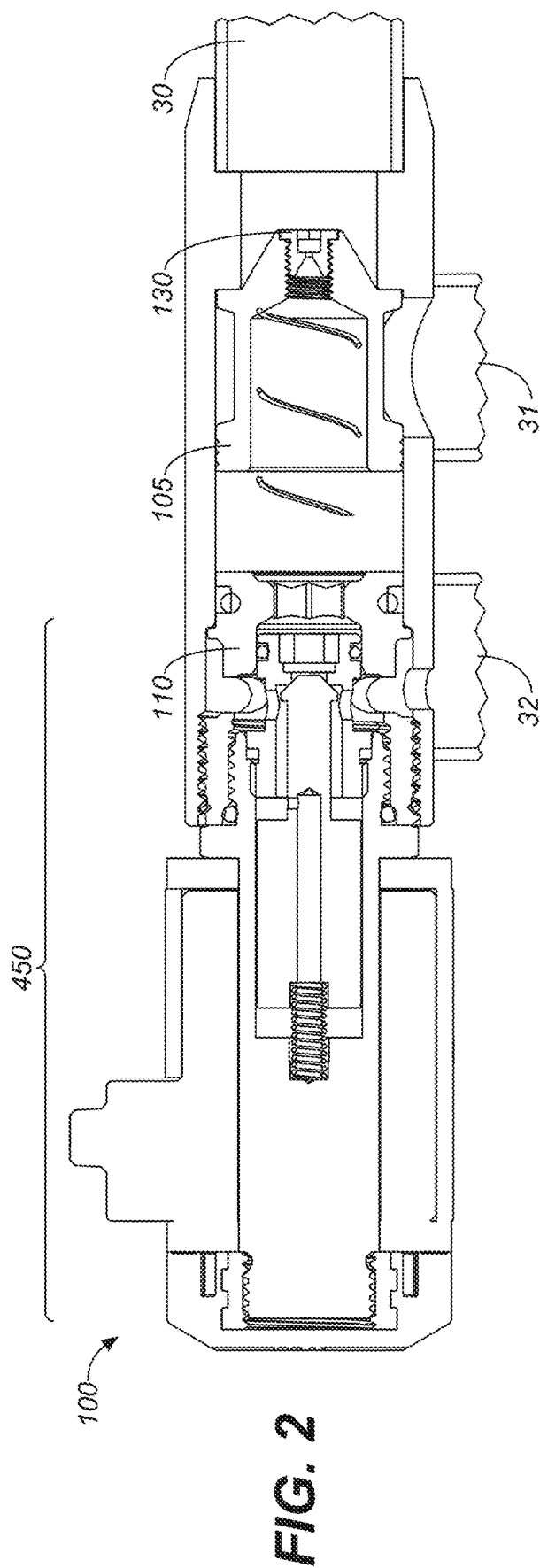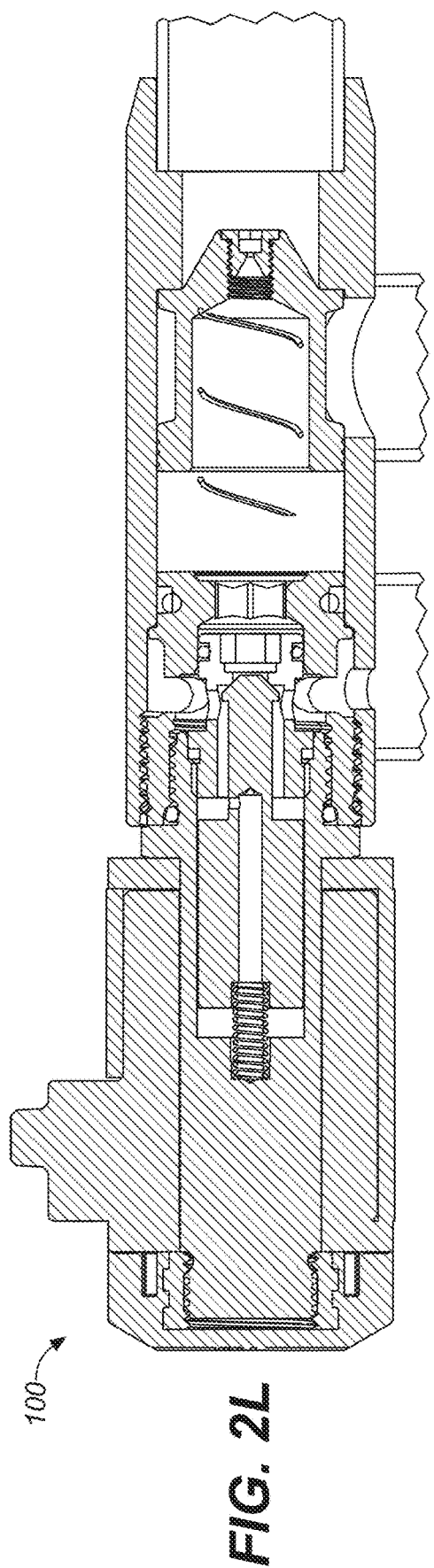

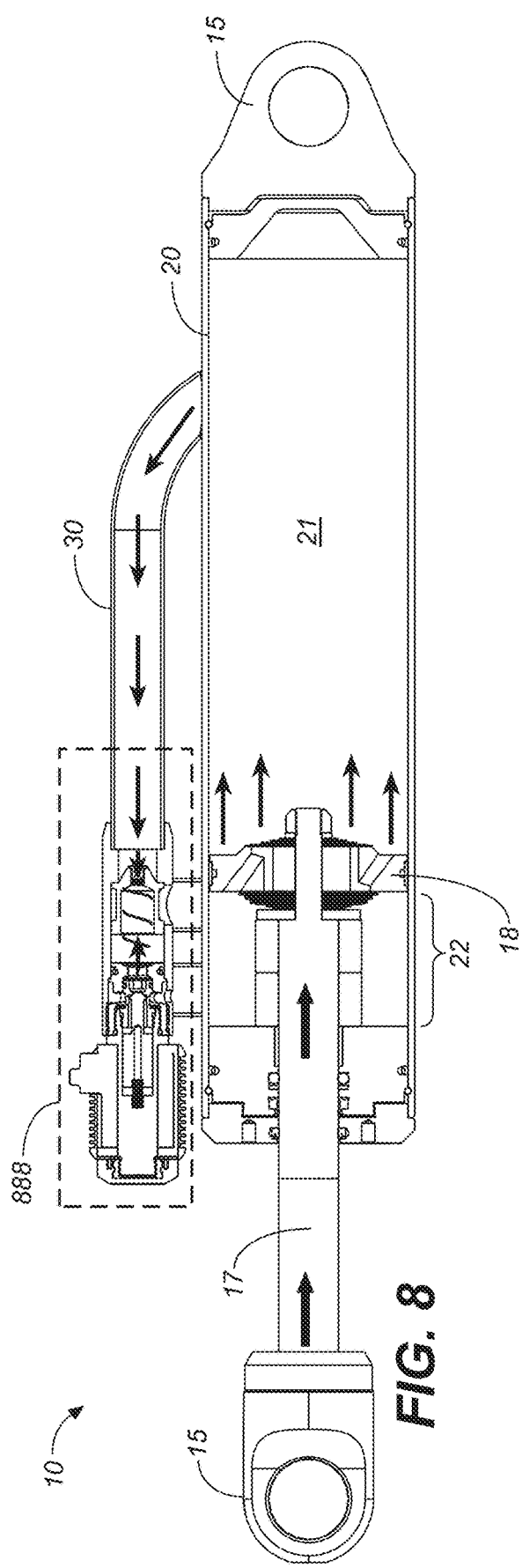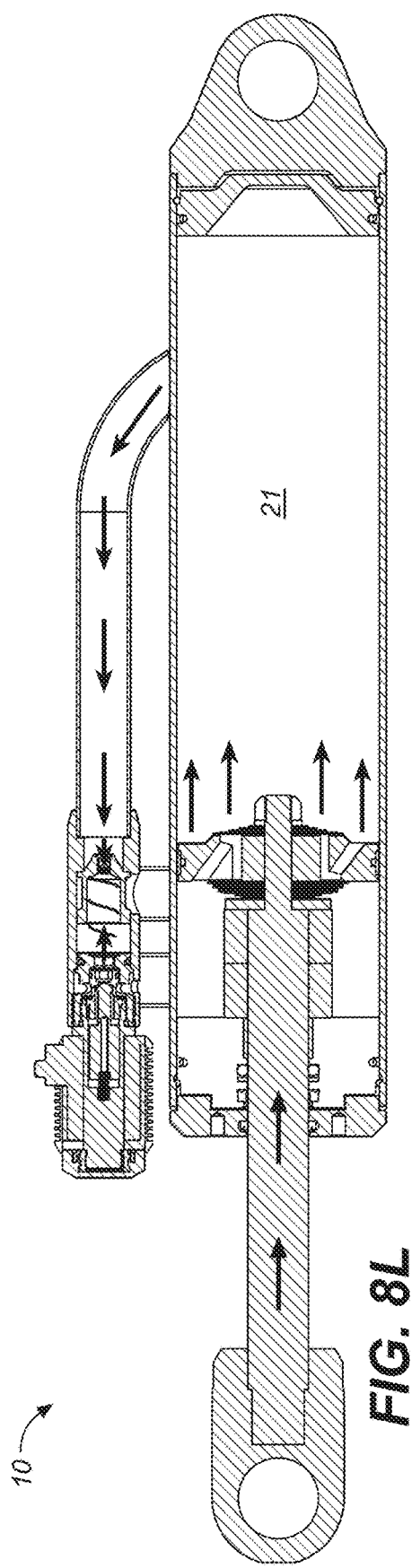

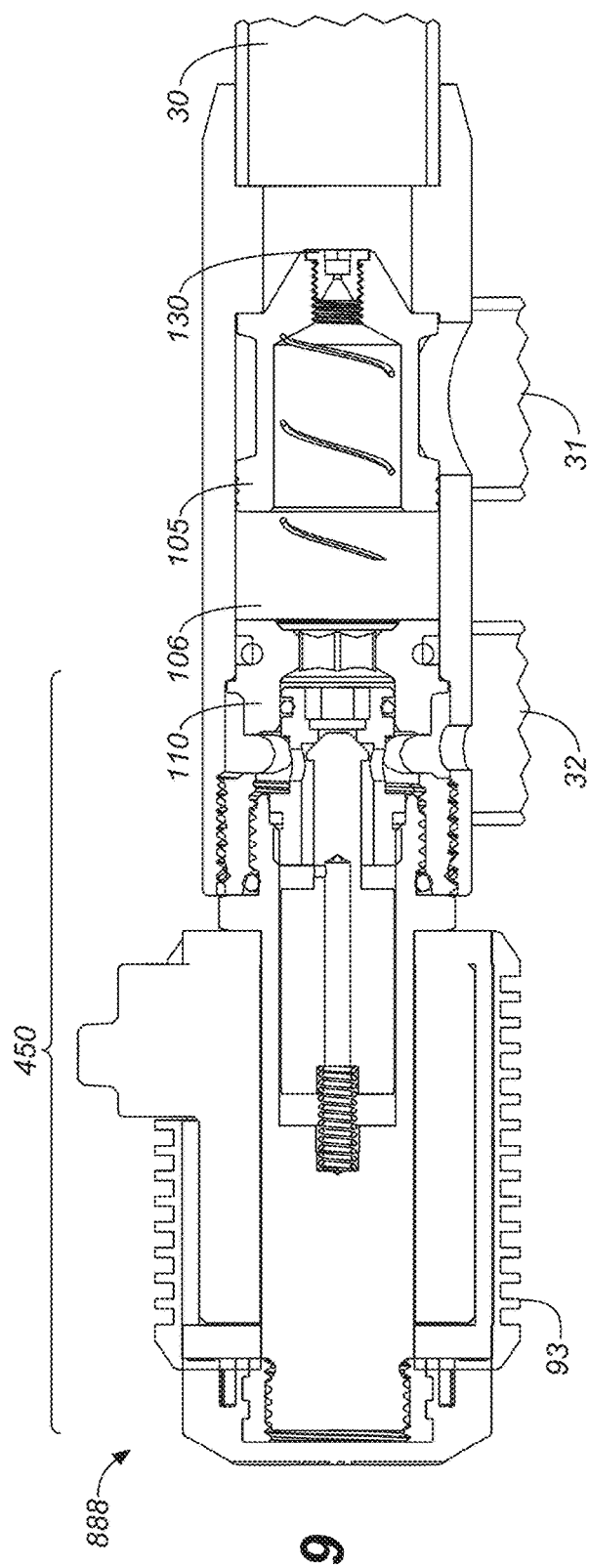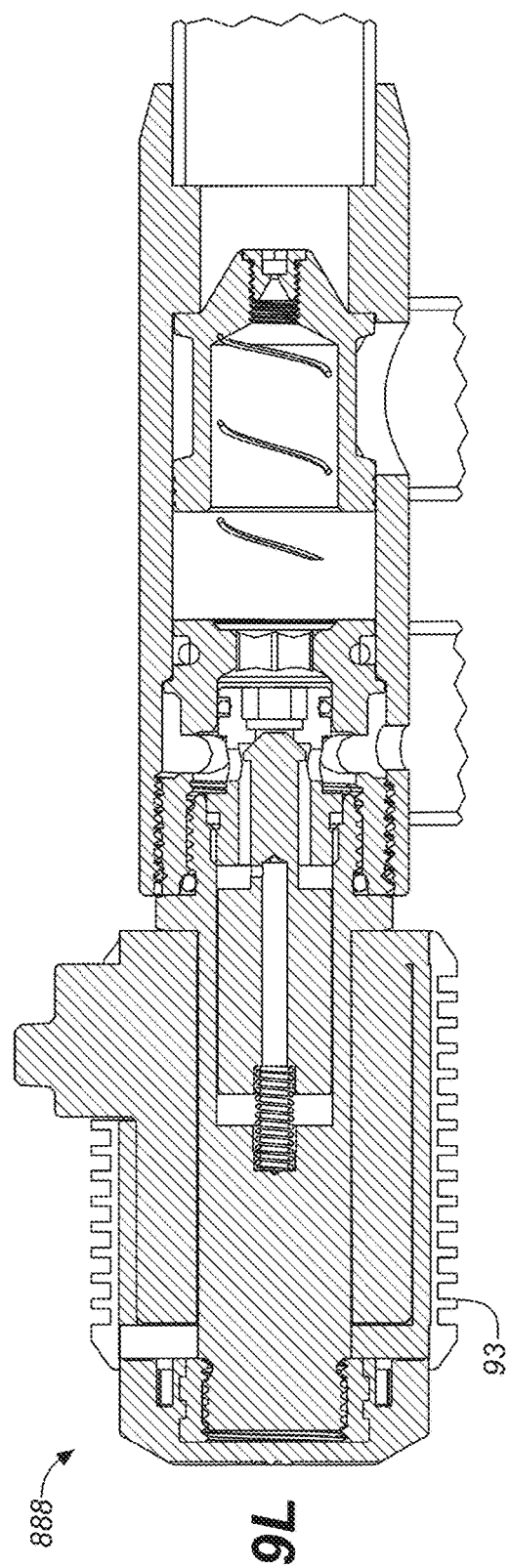

ELECTRONIC EXTERNAL BYPASS

CROSS-REFERENCE TO RELATED APPLICATIONS

The application Ser. No. 17/337,854 claims priority to and benefit of U.S. Provisional Patent Application No. 63/035,167 filed on Jun. 5, 2020, entitled "AN ELECTRONIC EXTERNAL BYPASS" by Bobby Smith et al. and assigned to the assignee of the present application, the disclosure of which is hereby incorporated by reference in its entirety.

This application claims priority to and benefit of co-pending U.S. patent application Ser. No. 17/337,854 filed on Jun. 3, 2021, entitled "ELECTRONIC EXTERNAL BYPASS" by Bobby Smith et al. and assigned to the assignee of the present application, the disclosure of which is hereby incorporated by reference in its entirety.

FIELD OF THE INVENTION

Embodiments of the invention generally relate to methods and apparatus for use in a vehicle shock absorber.

BACKGROUND OF THE INVENTION

Vehicle suspension systems typically include a damping component or components to provide for a comfortable ride, enhance performance of a vehicle, and the like. For example, a driver of a vehicle on a paved road would often prefer a softer suspension setting for a more comfortable ride. However, the softer setting can deleteriously affect the vehicle's steering and ride performance when passing over obstacles such as bumps, holes, ruts, washboards, and the like. In contrast, if the suspension is set firmly, then vehicle performance may be enhanced at the cost of ride comfort.

BRIEF DESCRIPTION OF THE DRAWINGS

FIG. 1A is a section view of a shock with a solenoid-controlled bypass circuit in a compression stroke with a closed bypass, in accordance with an embodiment.

FIG. 1AL is a line diagram of a shock with a solenoid-controlled bypass circuit in a compression stroke with a closed bypass, in accordance with an embodiment.

FIG. 1B is a section view of a shock with a solenoid-controlled bypass circuit in a compression stroke with an open bypass, in accordance with an embodiment.

FIG. 1BL is a line diagram of a shock with a solenoid-controlled bypass circuit in a compression stroke with an open bypass, in accordance with an embodiment.

FIG. 2 is a section view of the solenoid-controlled bypass circuit, in accordance with an embodiment.

FIG. 2L is a line diagram of the solenoid-controlled bypass circuit, in accordance with an embodiment.

FIG. 8 is a section view of a shock with a solenoid-controlled bypass circuit having a heat dissipater, in accordance with an embodiment.

FIG. 8L is a line diagram of a shock with a solenoid-controlled bypass circuit having a heat dissipater, in accordance with an embodiment.

FIG. 9 is a section view of the solenoid-controlled bypass circuit having a heat dissipater, in accordance with an embodiment.

FIG. 9L is a line diagram of the solenoid-controlled bypass circuit having a heat dissipater, in accordance with an embodiment.

Figure 3:
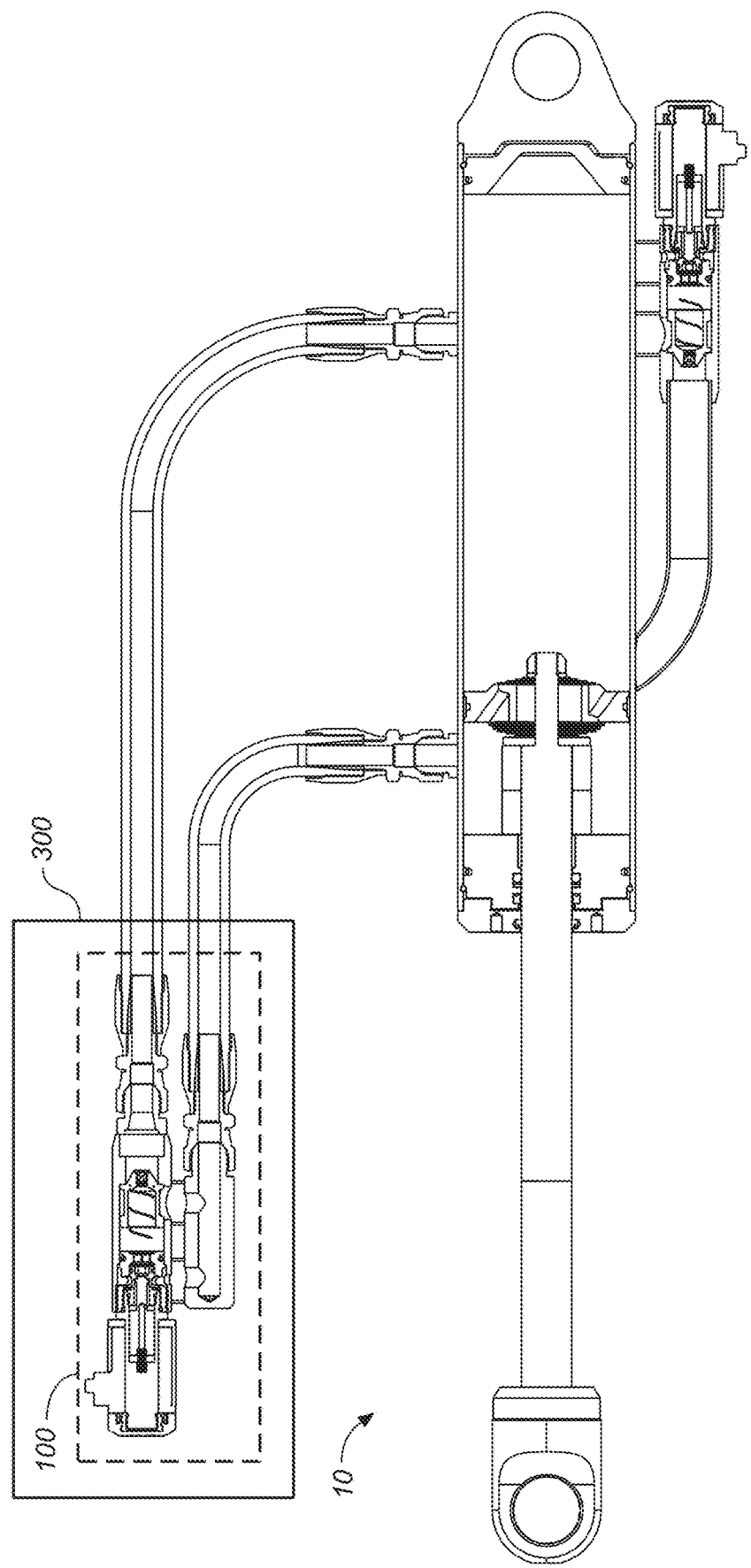
FIG. 3 is a section view of a remote solenoid-controlled bypass circuit located away from the shock, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Embodiments of the present technology provide tunability for the vehicle across different environments, different terrain, and the like. For example, the vehicle could be driven on a road to a dirt circuit, raced at the dirt circuit, and driven home on the road. In so doing, the same vehicle and shock assembly could be used with very different performance configurations as provided by the solenoid bypass circuit disclosed herein.

Moreover, the solenoid bypass circuit improves the performance of a mechanical adjustable damper. In general, improvement in the performance refers, in one embodiment, to an ability to tune the damping by adjustment to the restriction of the flow of working fluid through the external bypass. The adjustment to the solenoid bypass circuit can be remotely performed. Moreover, by using a solenoid bypass circuit, the adjustments can be finer, e.g., the solenoid bypass circuit provides an almost infinite amount of adjustment based on different electrical inputs. In contrast to mechanical adjustments that are limited by thread pitch and the like.

In operation, the shock(s) on the vehicle is used for all vehicle speeds. The range of speeds would begin at a very low vehicle operating speed, such as a rock crawl, and then move through a "ride zone"—e.g., the normal operating speed of the vehicle. Normally, in the ride zone, there can be one or more incursions into an "event zone". In general, the event zone refers to an event (or set of events) that puts one or more of the shocks of the vehicle suspension into a high shaft speed scenario. These events can include, but are not limited to, a pothole, a jump, traversing a corner, going over a rise, through a dip, across a whoop section, and the like. Often, these events can be further magnified by the speed of the vehicle. For example, the pressures on one or more shocks of a vehicle going around a corner at 20 miles per hour (mph) will be much lower than the pressures on the one or more shocks of a vehicle going around the same corner at 80 mph.

Referring now to FIG. 1A, a section view of a shock assembly 10 in a compression stroke is shown in accordance with one embodiment. FIG. 1AL, a line diagram of a shock assembly 10 in a compression stroke is shown in accordance with one embodiment. Shock assembly 10 includes eyelets 15, piston rod 17, damping piston 18, and damping chamber 20. In one embodiment, damping chamber 20 is divided into a compression side 21 and rebound side 22 by damping piston 18. Shock assembly 10 also includes a compression external bypass fluid flow path 30 having a compression solenoid-controlled bypass circuit 100.

In its basic form, the shock assembly 10 controls the speed of movement of the piston rod 17 by metering incompressible fluid from one side of the piston to the other. During a compression stroke the incompressible fluid is metered from the compression side to the rebound side of the damping chamber (and in reverse during the rebound or extension stroke).

In one embodiment, piston 18 is equipped with fluid paths therethrough to permit damping fluid within the damping chamber 20 to be metered through the piston 18. For example, when the piston rod 17 (or shaft) moves into the damping chamber 20, working fluid moves from a first side (the compression side 21) to an opposite side (the rebound side 22) through the paths formed in the piston 18. In one embodiment, fluid can also move through a flow path from the damping chamber 20 into an external reservoir. A configuration of an external reservoir is described in U.S. Pat. No. 7,374,028 which is entirely incorporated herein by reference.

It should be appreciated that the solenoid-controlled bypass circuit 100 discussed herein could be incorporated into a shock like that shown in FIGS. 1A-1BL, or in another embodiment, into a shock absorber with more, fewer, or different components than those shown in shock assembly 10. Moreover, the solenoid-controlled bypass circuit 100 disclosed herein could be used on one or more shock absorbers in an assortment of vehicles such as, but not limited to a bicycle, motorcycle, ATV, jet ski, car, snow mobile, side-by-side, and the like.

Although only a compression solenoid-controlled bypass circuit 100 is shown in FIG. 1A, in one embodiment, as shown in the section view of FIG. 1B and FIG. 1BL, shock assembly 10 will include a compression solenoid-controlled bypass circuit 100 and a rebound external bypass fluid flow path 30r with a rebound solenoid-controlled bypass circuit 100r.

In FIGS. 1A and 1AL, the external bypass fluid flow path 30 of shock assembly 10 is closed. That is, the pressure built up during the compression stroke is not large enough to open the poppet valve 105 (of FIG. 2). This could be due to the low speed of the compression stroke, due to the compression solenoid-controlled bypass circuit 100 increasing the "pop" pressure for the poppet valve 105 or the like. In one embodiment, the compression solenoid-controlled bypass circuit 100 will increase the "pop" pressure for the poppet valve 105 due to an event encounter, a driver (or other user) input, or the like.

Referring again to FIGS. 1B and 1BL, a section view of shock assembly 10 in a compression stroke with the external bypass fluid flow path 30 open, is shown in accordance with one embodiment. Shock assembly 10 of FIGS. 1B and 1BL is similar to the shock assembly 10 described in FIGS. 1A and 1AL. That is, shock assembly 10 includes eyelets 15, piston rod 17, damping piston 18, and damping chamber 20. In one embodiment, damping chamber 20 is divided into a compression side 21 and rebound side 22 by damping piston 18. Shock assembly 10 also includes a compression external bypass fluid flow path 30 having a compression solenoid-controlled bypass circuit 100, and a rebound bypass fluid flow 30r having a rebound solenoid-controlled bypass circuit 100r.

Although both a rebound solenoid-controlled bypass circuit 100r and a compression solenoid-controlled bypass circuit 100 are shown, in one embodiment, the shock assembly 10 could have only a compression solenoid-controlled bypass circuit 100 or only a rebound solenoid-controlled bypass circuit 100r. In FIGS. 1B and 1BL, the bypass fluid flow path 30 of shock assembly 10 is open. That is, the pressure during the compression stroke was large enough to open the poppet valve and allow the fluid to flow through the bypass fluid flow pathways 30, (and 31 and 32 of FIG. 2). This could be due to the higher speed of the compression stroke increasing the fluid pressure above the "pop" pressure of the poppet valve, the compression solenoid-controlled bypass circuit 100 decreasing the "pop" pressure of the poppet valve, or the like. Although a poppet valve is shown, in one embodiment, the poppet valve 105 could be replaced be another type of valve such as a gate valve, or the like.

In one embodiment, the rebound and the compression bypass could be the same external bypass fluid flow path with a check valve therein. For example, during a compression stroke the check valve would only allow bypass flow from the compression side to the rebound side, and then during the rebound stroke, the check valve would switch and only allow bypass flow from the rebound side to the compression side. In one embodiment, the check valve would be controlled by the solenoid circuit that would operate for both rebound and compression of shock assembly 10.

Moreover, although only a single external bypass fluid flow path 30 is shown for compression and only a single external bypass fluid flow path 30r is shown for rebound; it should be appreciated that there could be any number of different external bypass fluid flow paths at different lengths along the damping chamber 20 for either or both of rebound and compression bypass. In one embodiment, the use of multiple external bypass fluid flow paths would allow for different bypass flow volumes. For example, the more available external bypass fluid flow paths on the compression side 21 would allow for a larger volume of bypass fluid flow. Then, as each external bypass fluid flow path is passed by the piston 18 during the compression stroke, the flow volume of the external bypass fluid flow paths would be reduced accordingly.

In one embodiment, each of the external bypass fluid flow paths has its own solenoid compression (or rebound) circuit (or portion thereof). In one embodiment, two or more of the external bypass fluid flow path poppet valve pressure settings would be controlled by the same solenoid compression (or rebound) circuit shown in FIG. 2. In one embodiment, both of the compression and rebound external bypass fluid flow path poppet valve pressure settings would be controlled by the same solenoid circuit (e.g., the same live valve).

In one embodiment, the compression solenoid-controlled bypass circuit 100 is able to vary the resistance of poppet valve 105 based upon the internal location of the piston 18 with respect to the damping chamber 20. In other words, the bypass flow resistance of poppet valve 105 would be increased as the piston 18 traverses the length of the damping chamber 20 during the compression stroke (and/or similarly during the rebound stroke). Thus, in one embodiment, instead of using a plurality of bypass pathways along the length of damping chamber 20, the active valve 450 (or solenoid) of the compression solenoid-controlled bypass circuit 100 could work with a single external bypass fluid flow path 30 (or a smaller number of bypass paths) and increase the resistance or "pop" pressure of poppet valve 105 in the compression external bypass fluid flow path 30 as the piston 18 travels through the compression side 21. In one embodiment, the compression solenoid-controlled bypass circuit 100 would completely close poppet valve 105 before the piston 18 could bottom out in the damping chamber 20.

Referring now to FIG. 2, a sectional view of the solenoid circuit (e.g., compression solenoid-controlled bypass circuit 100 and rebound solenoid-controlled bypass circuit 100r) of FIGS. 1A and 1B is shown in accordance with an embodiment. FIG. 2L is a line diagram of the solenoid-controlled bypass circuit 100 of FIGS. 1A and 1B shown in accordance with an embodiment. In FIG. 2, the solenoid-controlled bypass circuit 100 includes a poppet valve 105, a solenoid adapter 110, an active valve 450 (or solenoid) or (as described in detail in FIGS. 4-6) and bypass fluid flow pathways 30, 31, and 32.

In one embodiment the poppet valve 105 has a pilot orifice 130 that creates a pressure drop. The pressure drop allows the active valve 450 to have additional control authority over the poppet valve 105 because of the lower pressure on the back side thereof. Depending upon the piston rod speed and the firmness-softness setting of the solenoid, the working fluid is going to encounter a different resistance in moving from external bypass fluid flow path 30 through poppet valve 105, solenoid adapter 110 and through bypass pathways 31 and 32.

For example, in a soft setting the working fluid will encounter little resistance before the poppet valve 105 opens. In contrast, in a firmer setting, the working fluid will encounter a larger amount of resistance before the poppet valve 105 opens. In one embodiment, the active valve 450 will also have a poppet valve (e.g., solenoid adapter 110) that will also open to allow the working fluid to flow through both pathways A2 and A3.

Referring now to FIG. 3, a section view of the compression solenoid-controlled bypass circuit 100 located at a remote location 300 different than the location of shock assembly 10 is shown in accordance with one embodiment. In one embodiment, the compression solenoid-controlled bypass circuit 100 is moved away from the shock assembly 10 (e.g., remote from the damper) to remove any heat transference from the shock assembly 10 (or other vehicle components) that could be detrimental to the compression solenoid-controlled bypass circuit 100.

In one embodiment, such as in an offroad or high-performance environment, the piston 18 is stiffly valved for bottom out control purposes. That is, the shock assembly 10 compression stiffness is great enough to ensure that the shock does not bottom out when the vehicle encounters an event. In order to obtain the appropriate compression stiffness, the main shim stack controlling the flow through the piston 18 is designed to reduce or stop fluid flow until a large compression force is produced. Because of the main stack "weight", the normal performance of such a shock setting is very harsh in the ride zone.

Generally, there is always some amount of working fluid going through the piston 18, however, a bypass is used to reduce the forces (and therefore the shock stiffness and ride comfort) in the ride zone. That is, the bypass is used to reduce the stiffness of the shock during the compression stroke (and/or rebound stroke) while it is within a "normal operating portion" of shock assembly 10 operation. For example, in one embodiment, the piston 18 can basically move from the top of the damping chamber 20 to the bottom. However, to provide the best opportunity to reduce the chance of bottom out (e.g., the piston 18 reaching the bottom of the damping chamber 20), the external bypass fluid flow path 30 is located some distance above the bottom of the damping chamber 20 such that after the piston 18 reaches a certain point in the compression stroke, all remaining fluid in the compression side 21 would have to flow through the valving of the piston 18.

In one embodiment, the bypass fluid flow path 30 is controlled by a solenoid bypass circuit 100 and includes poppet valve 105 that is designed to open at a lower pressure than the main stack controlling the flow through the valve(s) in piston 18. By opening at a lower pressure, poppet valve 105 will allow some fluid to flow around the piston 18 during the compression stroke (and/or rebound stroke) thereby "softening" the shock assembly 10 which will result in a smoother ride. In one embodiment, the bypass is active over all shaft speeds in the ride zone. As stated herein, it is the shaft speed that is going to determine the amount of pressure on the poppet valve 105 and thus how much it is opening.

For example, in a purely mechanical bypass, the poppet valve 105 is free flowing such that the poppet valve 105 "pops" open and allows some of the working fluid to bypass the piston 18 which lowers damping force (as opposed to forcing all the working fluid to flow through the piston valving causing stiffer shock performance)—which provides position sensitivity. In the following examples, the compression of the shock assembly 10 is utilized for purposes of clarity. However, it should be appreciated that during rebound of shock assembly 10, the rebound operation is similar, and the solenoid bypass circuit is rebound solenoid-controlled bypass circuit 100r.

In a low shaft speed compression, the pressure would be lower (e.g., lower forces) which would not necessarily open the poppet valve 105 (or not open poppet valve 105 to its full travel), thereby forcing most of the displaced fluid to pass through the piston valving from the compression side 21 to the rebound side 22 during the compression stroke. In contrast, during a high shaft speed compression, the pressure would also be higher (e.g., larger forces) which would open the poppet valve 105 to its full travel distance allowing a larger amount of the displaced working fluid to pass through the bypass during the compression stroke.

In one embodiment, as described herein, solenoid bypass circuit (e.g., compression solenoid-controlled bypass circuit 100) extends the range of compression stiffness settings for shock assembly 10 by allowing an electronic adjustment to be made to the pressure necessary to open the poppet valve 105. In one embodiment, this adjustment is made by using active valve 450 in the compression solenoid-controlled bypass circuit 100. In one embodiment, the compression solenoid circuit will modify the pressure required to open or "pop" the poppet valve 105 on the fly. That is, the compression solenoid-controlled bypass circuit 100 will modify the opening pressure for the poppet valve 105 to control how much damping relief the external bypass fluid flow path 30 is providing. In one embodiment, the compression solenoid-controlled bypass circuit 100 can lower the pressure required to open the poppet valve 105 thereby causing a softer compression stroke for shock assembly 10. In general, the softer compression stroke of shock assembly 10 provides a more comfortable ride that will reduce driver/rider fatigue and the like.

In one embodiment, the compression solenoid-controlled bypass circuit 100 also allows the compression force to be increased in the ride zone during an occurrence of different events. In other words, the compression solenoid-controlled bypass circuit 100 will communicate with one or more sensors to determine that an event is being encountered (or about to be encountered) and raise the pressure required to open the poppet valve 105 thereby causing a stiffer compression stroke. In one embodiment, the stiffer compression is used for certain events such as, but not limited to, a jumping event (allows the shock to be stiffened to absorb the landing impact), a cornering scenario (allow the shock on the inside wheel to be stiffened up to hold the inside wheel up a bit through the corners), etc.

In one embodiment, the compression solenoid-controlled bypass circuit 100 is adjusted by a manual input to a remote control. For example, the compression solenoid circuit (using active valve 450, electronics (e.g., solenoid and controller), and the like) is coupled with a remote system that allows a user to provide adjustment inputs to compression solenoid-controlled bypass circuit 100 remotely. In one embodiment, the remote system is a control device in a cockpit (e.g., driver, rider, passenger), a control device in a follow-vehicle, a control device with a maintenance crew, etc.

In one embodiment, the compression solenoid-controlled bypass circuit 100 is also able to automatically adjust the pressure required to open poppet valve 105. For example, the compression solenoid-controlled bypass circuit 100 includes active valve 450 and also includes a processor. The processor receives data from one or more sensors, evaluates the sensor data using an algorithm or the like to make setting changes/determinations, and provides an adjustment input to the active valve 450 of the compression solenoid-controlled bypass circuit 100 automatically and based on the result of the setting changes/determinations. In one embodiment, the compression solenoid-controlled bypass circuit 100 is capable of being controlled remotely and automatically. In one embodiment, the compression solenoid-controlled bypass circuit 100 is continuously adjusting the pressure required to open poppet valve 105.

Example Active Valve

Figure 4:
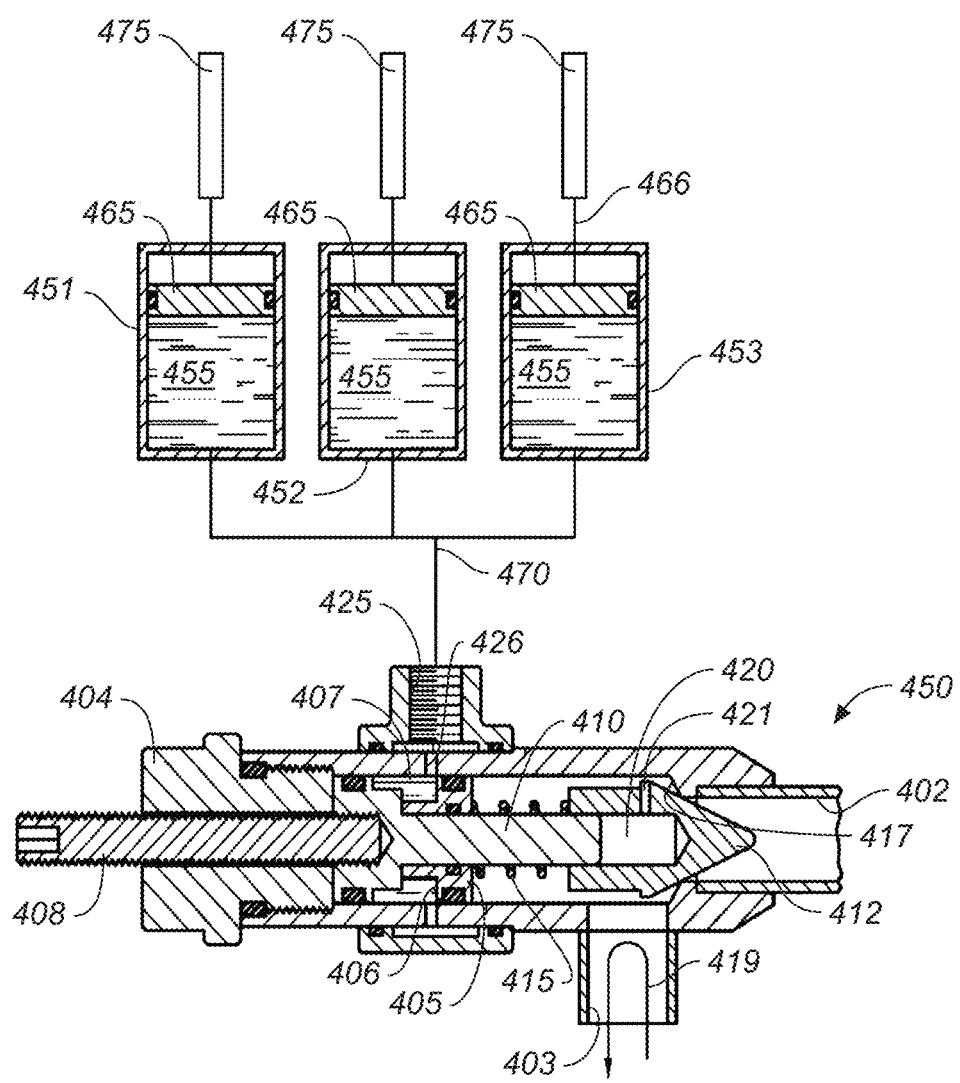
FIG. 4 is an enlarged section view showing an active valve and a plurality of valve operating cylinders in selective communication with an annular piston surface of the valve, in accordance with an embodiment.

Referring now to FIG. 4, an enlarged view of an active valve 450 is shown in accordance with an embodiment.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Although FIG. 4 shows the active valve 450 in a closed position (e.g. during a rebound stroke of the shock assembly), the following discussion also includes the opening of active valve 450. Active valve 450 includes a valve body 404 housing a movable valve piston 405 which is sealed within the body. The valve piston 405 includes a sealed chamber 407 adjacent an annularly-shaped piston surface 406 at a first end thereof. The chamber 407 and annularly-shaped piston surface 406 are in fluid communication with a port 425 accessed via opening 426. Two additional fluid communication points are provided in the body including an inlet (such as orifice 402) and an outlet (such as orifice 403) for fluid passing through the active valve 450.

Extending from a first end of the valve piston 405 is a shaft 410 having a member 412 (which in one embodiment is cone shaped, but in another embodiment other shapes such as spherical or flat, with corresponding seats, are also suitable) disposed on an end thereof. The member 412 is telescopically mounted relative to, and movable on, the shaft 410 and is biased toward an extended position due to a spring 415 coaxially mounted on the shaft 410 between the member 412 and the valve piston 405. Due to the spring biasing, the member 412 normally seats itself against a valve seat 417 formed in an interior of the valve body 404.

As shown, the member 412 is seated against valve seat 417 due to the force of the spring 415 and absent an opposite force from fluid entering the active valve 450 along orifice 402. As member 412 telescopes out, a gap 420 is formed between the end of the shaft 410 and an interior of member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the valve piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annularly-shaped piston surface 406 is exposed to the fluid.

Because each cylinder has a specific volume of substantially incompressible fluid and because the volume of the sealed chamber 407 adjacent the annularly-shaped piston surface 406 is known, the fluid contents of each cylinder can be used, individually, sequentially or simultaneously to move the piston a specific distance, thereby effecting the damping characteristics of the suspension system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the member 412 to urge it backwards, at least partially loading the spring 415 and creating a fluid flow path from the orifice 402 into and through orifice 403.

The characteristics of the spring 415 are typically chosen to permit active valve 450 (e.g. member 412) to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression shock assembly (particularly true when a solid piston is also used).

In one embodiment, the valve is open in both directions when the member 412 is "topped out" against valve body 404. In another embodiment however, when the valve piston 405 is abutted or "topped out" against valve body 404 the spring 415 and relative dimensions of the active valve 450 still allow for the member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing member 412 to open, close, or partially close orifice 402) can be applied to one shock assembly or one set of vehicle shock assemblies on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing member 412 to open, close, or partially close orifice 402) in the event of, for example, an increased or decreased pressure reading.

In one embodiment, active valve 450 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's shock assemblies (by adjusting the working size of the opening of orifice 402 by causing member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the shock assembly 10, damping occurs as the distance between member 412 and orifice 402 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 404 rotates in a reverse direction than that described above and herein, the member 412 moves away from orifice 402 providing at least a partially opened fluid path.

Figure 5:
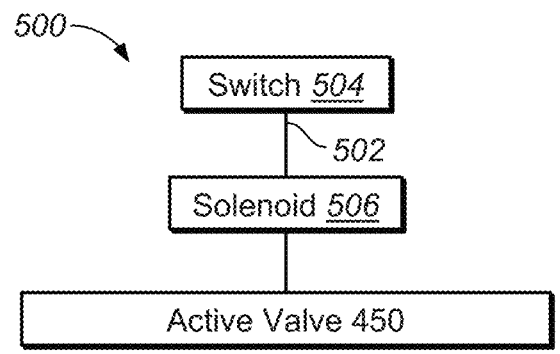
FIG. 5 is a schematic diagram showing a control arrangement for an active valve, in accordance with an embodiment.

FIG. 5 is a schematic diagram showing a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450, In one embodiment, the rotation of valve body 404 causes an indexing ring consisting of two opposing, outwardly spring-biased balls to rotate among indentions formed on an inside diameter of a lock ring.

As the valve body 404 rotates, member 412 at an opposite end of the valve is advanced or withdrawn from an opening in orifice 402. For example, the valve body 404 is rotationally engaged with the member 412. A male hex member extends from an end of the valve body 404 into a female hex profile bore formed in the member 412. Such engagement transmits rotation from the valve body 404 to the member 412 while allowing axial displacement of the member 412 relative to the valve body 404. Therefore, while the body does not axially move upon rotation, the threaded member 412 interacts with mating threads formed on an inside diameter of the bore to transmit axial motion, resulting from rotation and based on the pitch of the threads, of the member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding shock assembly 10. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension shock assemblies could be used alone or in combination. That is, one or more active valves could be operated simultaneously or separately depending upon needs in a vehicular suspension system.

For example, a suspension shock assembly could have one, a combination of, or each of an active valve(s): for a bottom out control, an internal bypass, for an external bypass, for a fluid conduit to the external reservoir 125, etc. In other words, anywhere there is a fluid flow path within a shock assembly 10, an active valve could be used. Moreover, the active valve could be alone or used in combination with other active valves at other fluid flow paths to automate one or more of the performance characteristics of the shock assembly. Moreover, additional switches could permit individual operation of separate active bottom out valves.

Figure 6:
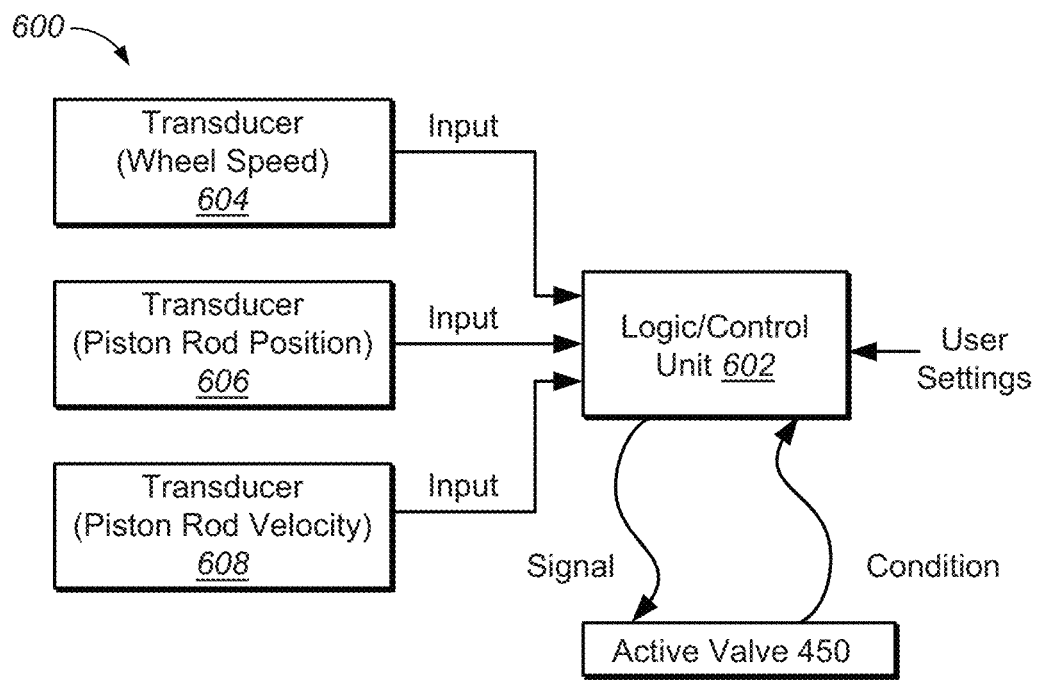
FIG. 6 is a schematic diagram of a control system based upon any or all of vehicle speed, damper rod speed, and damper rod position, in accordance with an embodiment.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping in a shock assembly in the event a damper rod reaches a certain velocity in its travel towards the bottom end of a shock assembly at a predetermined speed of the vehicle.

In one embodiment, the control system 600 adds damping (and control) in the event of rapid operation (e.g. high rod velocity) of the shock assembly 10 to avoid a bottoming out of the damper rod as well as a loss of control that can accompany rapid compression of a shock assembly with a relative long amount of travel. In one embodiment, the control system 600 adds damping (e.g., adjusts the size of the opening of orifice 402 by causing member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension shock assembly or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension shock assembly.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension shock assembly measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between member 412 and orifice 402). Thereafter, the condition, state or position of active valve 450 is relayed back to logic unit 602 via an active valve monitor or the like.

In one embodiment, logic unit 602 shown in FIG. 6 assumes a single active valve 450 corresponding to a single orifice 402 of a single shock assembly 10, but logic unit 602 is usable with any number of active valves or groups of active valves corresponding to any number of orifices, or groups of orifices. For instance, the suspension shock assemblies on one side of the vehicle can be acted upon while the vehicles other suspension shock assemblies remain unaffected.

Figure 7:
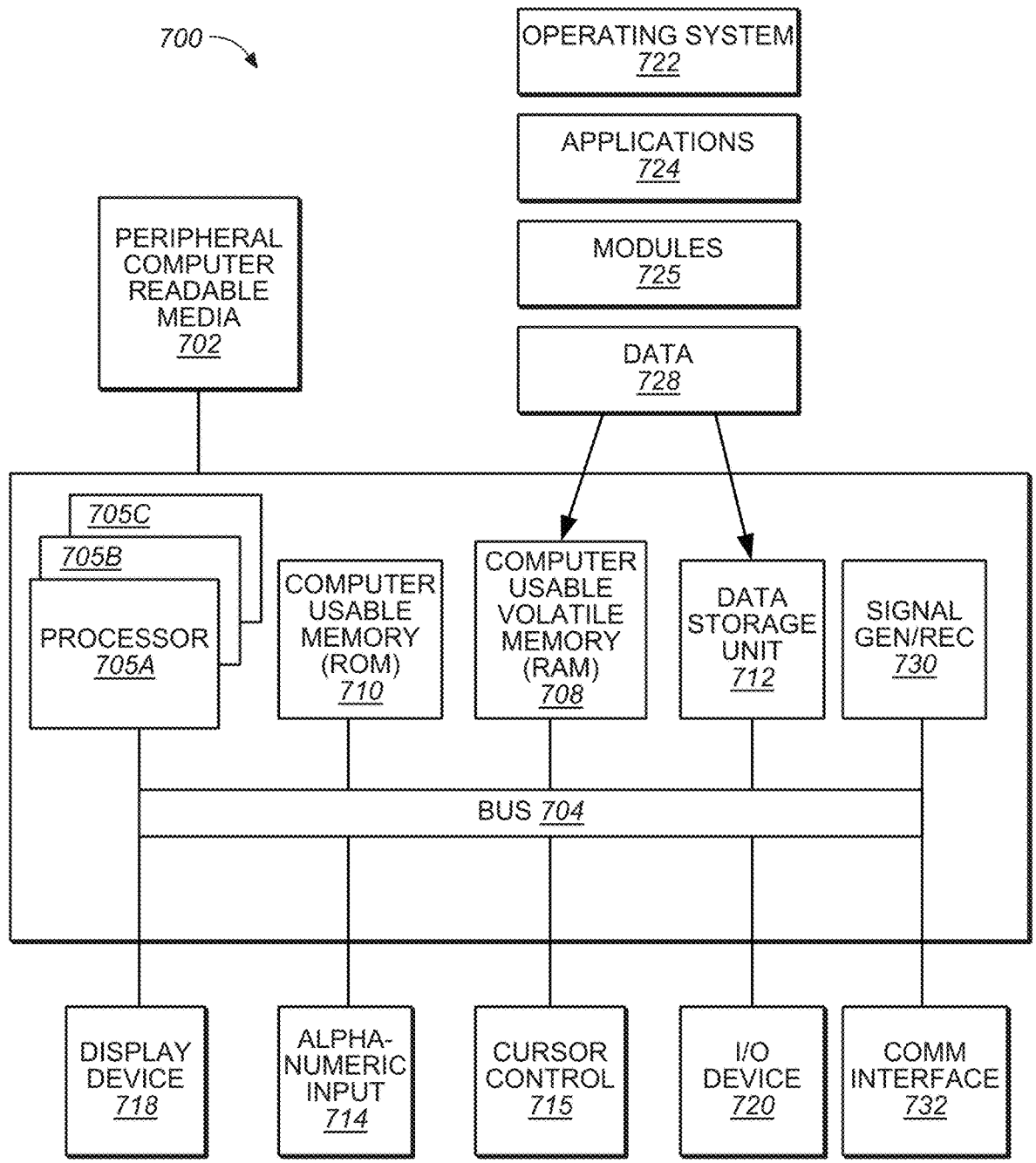
FIG. 7 is a block diagram of a computer system, in accordance with an embodiment.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, embodiments described herein can include some or all of the components of computer system 700. In different embodiments, systems and/or components can include communication capabilities (e.g., wired such as ports or the like, and/or wirelessly such as near field communication, Bluetooth, WiFi, or the like) such that some of the components of computer system 700 are within a single device while other components could be ancillary but communicatively coupled thereto (such as a mobile device, tablet, computer system or the like). For example, in one embodiment, one or more components described herein can be communicatively coupled to one or more different computing systems to allow a user (or manufacturer, tuner, technician, etc.) to adjust or modify any or all of the programming. In one embodiment, the programming includes computer-readable and computer-executable instructions that reside, for example, in non-transitory computer-readable medium (or storage media, etc.).

In one embodiment, computer system 700 includes an address/data/control bus 704 for communicating information, and a processor 705A coupled to bus 704 for processing information and instructions. As depicted in FIG. 7, computer system 700 is also well suited to a multi-processor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled to bus 704 for storing information and instructions for processors 705A, 705B, and 705C.

Computer system 700 also includes computer usable non-volatile memory 710, e.g., read only memory (ROM), coupled to bus 704 for storing static information and instructions for processors 705A, 705B, and 705C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 705A or processors 705A, 705B, and 705C. Computer system 700 also can optionally include a cursor control device 715 coupled to bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled to bus 704 for displaying information.

Referring still to FIG. 7, display device 718 of FIG. 7 may be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 725, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly couple computer system 700 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Referring now to FIG. 8, a section view of a shock assembly 10 with a solenoid-controlled bypass circuit 888 having a heat dissipater is shown in accordance with an embodiment. FIG. 8L a line diagram of a shock assembly 10 with a solenoid-controlled bypass circuit 888 having a heat dissipater is shown in accordance with an embodiment. The shock assembly 10 of FIGS. 8 and 8L are similar to the discussion of FIGS. 1A and 1AL and as such, the discussion of the similarities will not be repeated for purposes of clarity but is incorporated herein by reference.

The shock assembly 10 of FIGS. 8 and 8L includes a heat dissipater about the solenoid portion of the solenoid-controlled bypass circuit 888 which is shown and described in more detail in FIGS. 9 and 9L.

In one embodiment, the heat dissipater is a passive heat dissipator consisting of one or more cooling component such as (or a combination of): a cooling fin, a heat sink, a thermal mass, or the like.

In one embodiment, the heat dissipater 93 is an active heat dissipator consisting of one or more cooling component such as (or a combination of): a fluid filled radiator, a fan, or the like.

In one embodiment, heat dissipater 93 is a hybrid heat dissipator consisting of at least one active cooling component and at least one passive cooling component. In one embodiment, heat dissipater 93 consists of at least two active cooling components and at least one passive cooling component. In one embodiment, heat dissipater 93 consists of at least one active cooling component and at least two passive cooling component. In one embodiment, heat dissipater 93 consists of at least two active cooling component and at least two passive cooling component.

With reference now to FIG. 9, a section view of the solenoid-controlled bypass circuit 888 having a heat dissipater 93 is shown in accordance with an embodiment. FIG. 9L is a line diagram of the solenoid-controlled bypass circuit having heat dissipater 93 is shown in accordance with an embodiment. The solenoid-controlled bypass circuit 888 of FIGS. 9 and 9L are similar to the discussion of the solenoid-controlled bypass circuit 100 of FIGS. 2 and 2L and as such, the discussion of the similarities will not be repeated for purposes of clarity, but is incorporated herein by reference in its entirety.

The solenoid-controlled bypass circuit 888 of FIGS. 9 and 9L includes heat dissipater 93 about the solenoid or active valve 450 portion of the solenoid-controlled bypass circuit 888 for cooling the active valve 450 and/or portions of the solenoid-controlled bypass circuit 888. In one embodiment, the heat dissipater 93 is a passive configuration using cooling fins. In one embodiment, the cooling fins are located about active valve 450. In one embodiment, the cooling fins of heat dissipater 93 are located remote from active valve 450 and a heat channel or the like is used to transfer the heat from active valve 450 and/or solenoid-controlled bypass circuit 888 to the heat dissipater 93.

In one embodiment, heat dissipater 93 could be another type of passive cooling component that is able to provide cooling for active valve 450 instead of (or in addition to cooling fins) such as a heat sink, thermal mass, or the like.

In one embodiment, the heat dissipater 93 is an active cooling component that is able to provide cooling for active valve 450 such as a fluid filled radiator, fan, or the like.

Figure 10A:
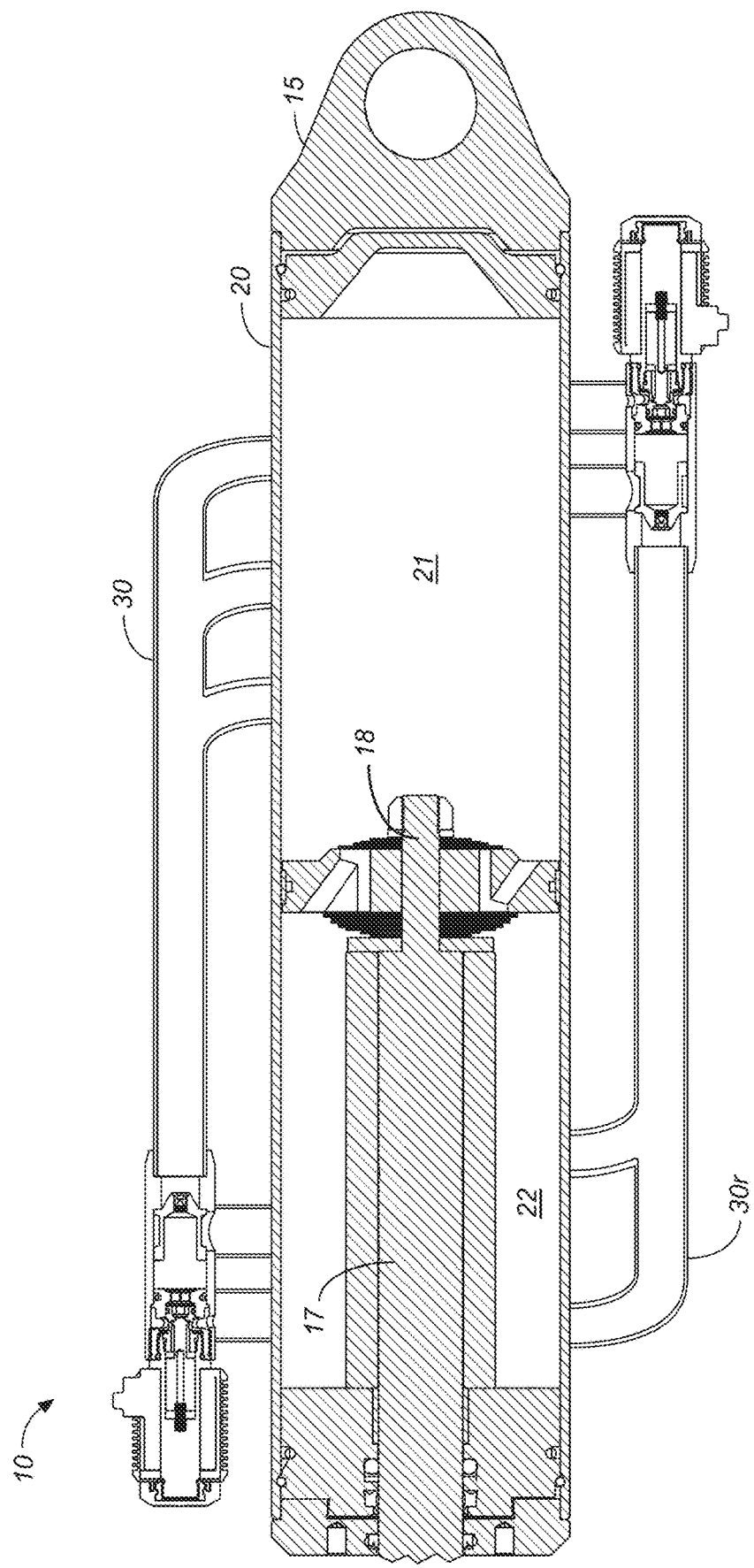
FIG. 10A is a line diagram of a section view of a shock body with a solenoid-controlled bypass circuit having a plurality of compression external bypass fluid flow paths and a plurality of rebound external bypass fluid flow paths, in accordance with an embodiment.

With reference now to FIG. 10A, a line diagram of a section view of a shock assembly 10 with a solenoid-controlled bypass circuit having a plurality of compression external bypass fluid flow paths 30 and a plurality of rebound external bypass fluid flow paths 30r is shown in accordance with an embodiment. In one embodiment, three external bypass fluid flow paths 30 are shown at different lengths along the damping chamber 20 for compression and two external bypass fluid flow paths 30r are shown at different lengths along the damping chamber 20 for rebound.

However, it should be appreciated that there could be any number of different compression external bypass fluid flow paths 30 and rebound external bypass fluid flow paths 30r at different lengths along the damping chamber 20 for either or both of rebound and compression bypass. In one embodiment, the use of multiple external bypass fluid flow paths would allow for different bypass flow volumes. For example, the more available external bypass fluid flow paths on the compression side 21 would allow for a larger volume of bypass fluid flow around piston 18.

In one embodiment, as each external bypass fluid flow path 30 is passed by the piston 18 during the compression stroke, the flow volume of the external bypass fluid flow paths 30 would be reduced accordingly. Similarly, the more available external bypass fluid flow paths on the rebound side 22 would allow for a larger volume of bypass fluid flow around piston 18.

In one embodiment, as each external bypass fluid flow path 30r is passed by the piston 18 during the rebound stroke, the flow volume of the external bypass fluid flow paths 30r would be reduced accordingly. In one embodiment, as shown in FIG. 10A, two or more of the external bypass fluid flow path poppet valve pressure settings would be controlled by the same solenoid compression (or rebound) circuit shown in FIG. 2 and/or FIG. 9.

Figure 10B:
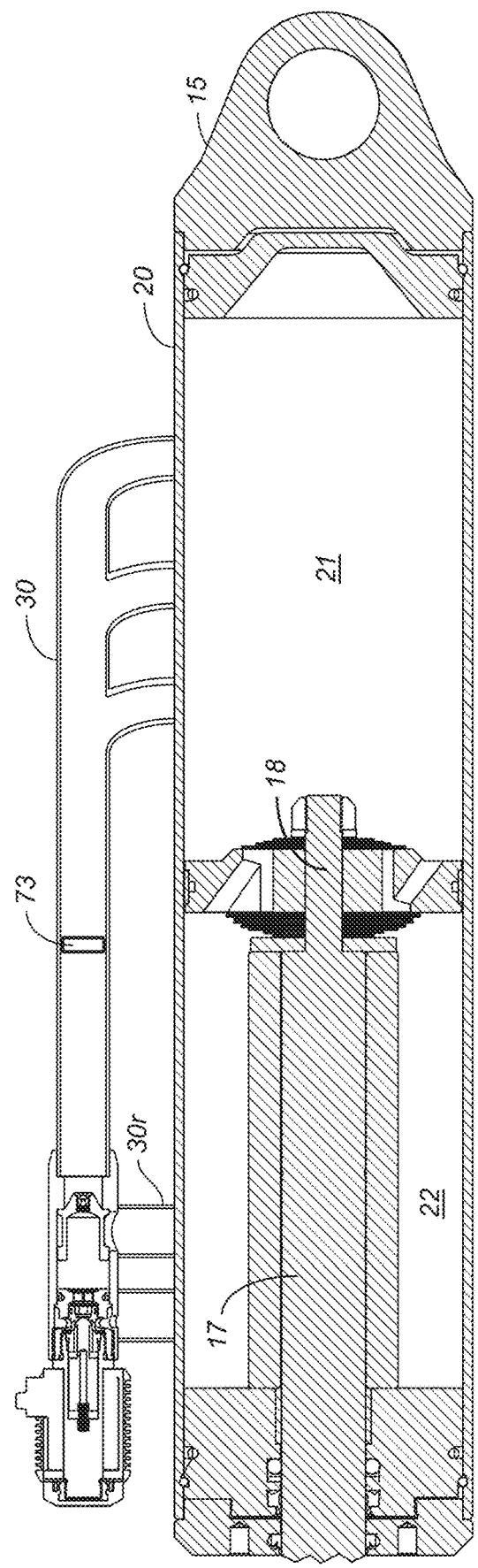
FIG. 10B is a line diagram of a section view of a shock body with a solenoid-controlled bypass circuit having a plurality of compression external bypass fluid flow paths, a plurality of rebound external bypass fluid flow paths, and a check valve, in accordance with an embodiment.

Referring now to FIG. 10B a line diagram of a section view of a shock body with a solenoid-controlled bypass circuit having a plurality of compression external bypass fluid flow paths 30, a plurality of rebound external bypass fluid flow paths 30r, and a check valve 73 is shown in accordance with an embodiment. Thus, as described herein, in one embodiment, the rebound and the compression bypass could be the same external bypass fluid flow path with a check valve 73 therein.

For example, during a compression stroke the check valve 73 would only allow bypass flow from the compression side to the rebound side, and then during the rebound stroke, the check valve 73 would switch and only allow bypass flow from the rebound side to the compression side. In one embodiment, the check valve 73 would be controlled by the solenoid circuit (e.g., active valve 450) that would operate for both rebound and compression of shock assembly 10.

Figure 10C:
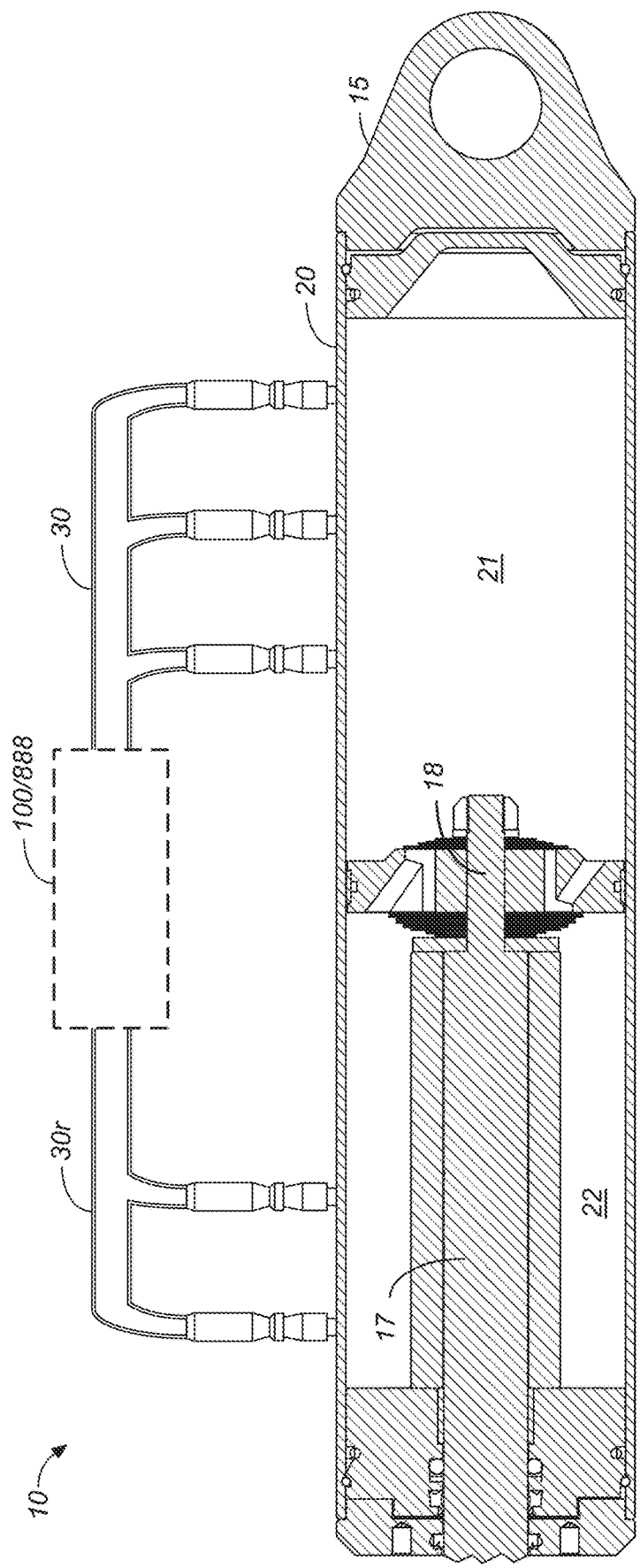
FIG. 10C is a line diagram of a section view of a shock body having a plurality of compression external bypass fluid flow paths and a plurality of rebound external bypass fluid flow paths with a single solenoid-controlled bypass circuit, in accordance with an embodiment.

Referring now to FIG. 10C, a line diagram of a section view of a shock body having a plurality of compression external bypass fluid flow paths 30 and a plurality of rebound external bypass fluid flow paths 30r with a single solenoid-controlled bypass circuit (100/888) is shown in accordance with an embodiment. In one embodiment, (as shown in different figures herein) each of the external bypass fluid flow paths has its own solenoid compression (or rebound) circuit (or portion thereof) or share a number of solenoid compression (or rebound) circuits. However, in one embodiment as shown in FIG. 10C, both of the compression external bypass fluid flow path 30 and rebound external bypass fluid flow path 30r poppet valve pressure settings are controlled by a single solenoid-controlled bypass circuit (100/888).

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. An electronic external bypass for a shock assembly comprising:
    a compression side fluid connection;
    a rebound side fluid connection;
    an external bypass fluid flow path from said shock assembly, said external bypass fluid flow path fluidly coupling said compression side fluid connection with said rebound side fluid connection;
    a solenoid circuit located at a remote location, said solenoid circuit to control a flow of a working fluid through said external bypass fluid flow path;
    a sensor coupled with a vehicle coupled to said shock assembly, said sensor configured to determine a value of at least one vehicle operation variable;
    a control system communicatively coupled with said solenoid circuit, said control system configured to automatically control operation of said solenoid circuit based upon said value of said at least one vehicle operation variable, wherein said solenoid circuit includes an active valve configured to control said flow of said working fluid through said external bypass fluid flow path such that said solenoid circuit provides an infinitely adjustable bypass pressure for said shock assembly; and
    said solenoid circuit comprising:
        a poppet valve; and
        said active valve configured to control a pop pressure of said poppet valve, such that said solenoid circuit provides said infinitely adjustable bypass pressure for said shock assembly.

2. The electronic external bypass for a shock assembly of claim 1, wherein said at least one vehicle operation variable is selected from the group consisting of: a speed of a wheel of said vehicle, a damper piston rod speed, and a damper piston rod position.

3. The electronic external bypass for a shock assembly of claim 1, wherein said at least one vehicle operation variable is selected from the group consisting of: compression strain of a damper piston rod, strain of a damper eyelet, accelerometer data for said vehicle, inclinometer data for said vehicle, performance data for said vehicle, component data for a component of said vehicle.

4. The electronic external bypass for a shock assembly of claim 1, wherein said at least one vehicle operation variable is comprised of at least one of a damper piston rod speed and a damper piston rod position, said at least one vehicle operation variable determined using modal resonance and an electro-magnetic transducer to determine said at least one of said damper piston rod speed and said damper piston rod position with respect to a housing of said shock assembly.

5. The electronic external bypass for a shock assembly of claim 1, wherein said at least one vehicle operation variable is comprised of a speed of a wheel of said vehicle, said at least one vehicle operation variable determined using a wheel speed transducer.

6. The electronic external bypass for a shock assembly of claim 1, wherein said control system is user-programmable.

7. A method for controlling an electronic external bypass for a shock assembly, said method comprising:
   determining a value for at least one vehicle operation variable for a vehicle coupled with said shock assembly;
   receiving said value for said at least vehicle operation variable at a control system of said shock assembly, said control system communicatively coupled with a solenoid circuit of said shock assembly, said solenoid circuit controlling flow of a working fluid through an external bypass fluid flow path of said shock assembly, wherein said external bypass fluid flow path fluidly couples a compression side fluid connection of a damper of said shock assembly with a rebound side fluid connection of said damper of said shock assembly; and
   automatically controlling operation of said solenoid circuit based upon said value of said at least one vehicle operation variable, wherein said solenoid circuit includes an active valve configured to control said flow of said working fluid through said external bypass fluid flow path such that said solenoid circuit provides an infinitely adjustable bypass pressure for said shock assembly; wherein said automatically controlling operation of said solenoid circuit based upon said value of said at least one vehicle operation variable further comprises:
      utilizing said solenoid circuit to control a pop pressure of a poppet valve disposed along said external bypass fluid flow path controlled by said active valve of said solenoid circuit of said shock assembly, such that a damping characteristic for said damper is adjusted.

8. The method for controlling an electronic external bypass for a shock assembly, as recited in claim 7, wherein said value of said at least one vehicle operation variable is determined using a sensor.

9. The method for controlling an electronic external bypass for a shock assembly, as recited in claim 7, wherein said determining said value for said at least one vehicle operation variable further comprises determining at least one vehicle operation variable selected from the group consisting of: a speed of a wheel of said vehicle, a damper piston rod speed, and a damper piston rod position.

10. The method for controlling an electronic external bypass for a shock assembly, as recited in claim 7, wherein said determining said value for said at least one vehicle operation variable further comprises determining at least one vehicle operation variable selected from the group consisting of: compression strain of a damper piston rod, strain of a damper eyelet, accelerometer data for said vehicle, inclinometer data for said vehicle, performance data for said vehicle, component data for a component of said vehicle.

11. The method for controlling an electronic external bypass for a shock assembly, as recited in claim 7, further comprising:
   utilizing said solenoid circuit to increase said pop pressure of said poppet valve disposed along said external bypass fluid flow path of said shock assembly such that a stiffness of said damper is increased.

12. The method for controlling an electronic external bypass for a shock assembly, as recited in claim 7, further comprising:
   utilizing said solenoid circuit to decrease said pop pressure of said poppet valve disposed along said external bypass fluid flow path of said shock assembly such that a stiffness of said damper is decreased.

13. The method for controlling an electronic external bypass for a shock assembly, as recited in claim 7, wherein said automatically controlling operation of said solenoid circuit based upon said value of said at least one vehicle operation variable further comprises:
   utilizing said solenoid circuit to convert electrical energy into mechanical movement of a valve body within said active valve of said shock assembly to maximize flow of said working fluid through an orifice in said active valve and place said damper in a fully open position.

14. The method for controlling an electronic external bypass for a shock assembly, as recited in claim 7, further comprising:
   receiving user input settings; and
   and utilizing said user input settings in conjunction with said value of said at least one vehicle operation variable to automatically control said operation of said solenoid circuit.

* * * * *